United States Patent
Adusumelli et al.

(10) Patent No.: US 11,989,123 B1
(45) Date of Patent: May 21, 2024

(54) SYSTEMS, METHODS, AND MEDIA FOR UPDATING, MANAGING, AND MAINTAINING A REFERENCE TEMPLATE FOR WEB SERVICE API TESTING

(71) Applicant: FMR LLC, Boston, MA (US)

(72) Inventors: Mahesh Venkat Adusumelli, Frisco, TX (US); Harish Kumar Sriramula, Irving, TX (US); Kirankumar Raka, Morrisville, NC (US); Christopher Addison, Cary, NC (US); Renuka Arumugam, Chennai (IN)

(73) Assignee: FMR LLC, Boston, MA (US)

(*) Notice: Subject to any disclaimer, the term of this patent is extended or adjusted under 35 U.S.C. 154(b) by 0 days.

(21) Appl. No.: 18/376,211

(22) Filed: Oct. 3, 2023

(51) Int. Cl.
G06F 11/00 (2006.01)
G06F 9/54 (2006.01)
G06F 11/34 (2006.01)
G06F 11/36 (2006.01)
G06F 16/28 (2019.01)

(52) U.S. Cl.
CPC .......... G06F 11/3692 (2013.01); G06F 9/547 (2013.01); G06F 11/3414 (2013.01); G06F 11/3433 (2013.01); G06F 16/285 (2019.01)

(58) Field of Classification Search
CPC .................................................. G06F 11/3414
See application file for complete search history.

(56) References Cited

U.S. PATENT DOCUMENTS

| | | | |
|---|---|---|---|
| 9,419,884 B1 * | 8/2016 | Li | H04L 43/50 |
| 10,223,239 B1 * | 3/2019 | Ghanbaran | G06F 11/3672 |
| 11,221,862 B2 | 1/2022 | Hally et al. | |
| 11,762,760 B1 * | 9/2023 | Fost | G06F 11/3414 |
| | | | 717/124 |
| 2016/0283364 A1 * | 9/2016 | Raghavan | G06F 11/3688 |
| 2018/0067845 A1 * | 3/2018 | Costello, Jr. | G06F 11/3688 |
| 2019/0188288 A1 * | 6/2019 | Holm | G06F 16/289 |
| 2021/0240600 A1 * | 8/2021 | Larosa | G06F 11/3664 |
| 2023/0047837 A1 * | 2/2023 | Chilupuri | G06F 9/547 |
| 2023/0089336 A1 * | 3/2023 | Battiato | G06F 11/3684 |
| | | | 717/124 |

OTHER PUBLICATIONS

"Overview of Puppeteer" Chrome for Developers [https://developer.chrome.com/docs/puppeteer/ ] Jan. 11, 2018, downloaded from the internet on Dec. 18, 2023, 2 pages.
Parasoft "Whitepaper The Solution to Your Test Data Management Headaches" Mar. 1, 2021, 10 pages.

* cited by examiner

*Primary Examiner* — Amine Riad
(74) *Attorney, Agent, or Firm* — Cesari and McKenna, LLP

(57) ABSTRACT

Techniques are provided for updating, managing, and maintaining a reference template for web service API testing. A plurality of logs, corresponding to a target application that provides one or more web services, may be captured. The captured logs may be filtered using information (e.g., URL extension) in the captured logs. Each filtered log may be parameterized and API request payload data may be extracted to generate a baseline template. A reference template may be compared with a corresponding baseline template to determine if they differ. If they differ, a test template may be generated by replacing each differing field of the reference template with a corresponding baseline template identifier. The test template may then be used in testing a web service API, such that a test template can conform with a changing web service API.

20 Claims, 11 Drawing Sheets

```
"checkFacRole.json" : [{

"url" : "http://... checkFacRole.json",

"method" : "POST",

"name" : "checkFacRole.json",

"headers" : "{sec-ch-ua=\"Chromium\",v=\"106\", \"Google Chrome\",v=\"106\", \"Not A=Brand\",v=\"99\", X-XSRF-
TOKEN=wIGWawD_QV78Y6RQ_joSHyhVuMZtheJGlN7n0715kw, sec-ch-ua-mobile=?0, User-Agent=Mozilla/5.0 (Windows NT 10.0; Win64; x64)
AppleWebKit/537.36 (KHTML, like Gecko) Chrome/106.0.0.0 Safari/537.36, Content-Type=application/json;charset=UTF-8,
Accept=application/json, text/plain, */*, ... \"Windows\"}", "request" : [{ } 310A
  }], "timestamp" : 2622.26942

```
"getPreferences.json" : [{
    "url" : "http://...preference/getPreferences.json",
    "method" : "POST",
    "name" : "getPreferences.json",
    "headers" : "{sec-ch-ua=\"Chromium\";v=\"106\", \"Google Chrome\";v=\"106\", \"Not.A=Brand\";v=\"99\", X-XSRF-
TOKEN=wlGWawD_QV78Y6RQ_joSHyhVuMZtheJGIN7n07ti5kw, sec-ch-ua-mobile=?0, User-Agent=Mozilla/5.0 (Windows NT 10.0;
Win64; x64) AppleWebKit/537.36 (KHTML, like Gecko) Chrome/106.0.0.0 Safari/537.36, Content-Type=application/json,
Accept=application/json, text/plain, */*, ...=\"Windows\"}",        ⎱ 305B1
    "request" : [{
        "preferences" : [{
            "preference" : "sidebarPreference",  ⎱ 310B1
            "category" : "sidebar"
        }]
    }],
    "timestamp" : 2592.247563
}, {
    "url" : "http://...preference/getPreferences.json",
    "method" : "POST",
    "name" : "getPreferences.json",
    "headers" : "{sec-ch-ua=\"Chromium\";v=\"106\", \"Google Chrome\";v=\"106\", \"Not.A=Brand\";v=\"99\", X-XSRF-
TOKEN=wlGWawD_QV78Y6RQ_joSHyhVuMZtheJGIN7n07ti5kw, sec-ch-ua-mobile=?0, User-Agent=Mozilla/5.0 (Windows NT 10.0; Win64; x64)
AppleWebKit/537.36 (KHTML, like Gecko) Chrome/106.0.0.0 Safari/537.36, Content-Type=application/json, Accept=application/json, text/plain,
*/*, ...=\"Windows\"}",                                              ⎱ 305B2
    "request" : [{
        "preferences" : [{
            "item" : "Configurator",
            "preference" : "TilePreference",    ⎱ 310B2
            "category" : "Home"
        }]
    }],
    "timestamp" : 2592.500787
}, {
```

```
"getSearchResults.json" : [ {
  "url" : "http:// ... getSearchResults.json",
  "method" : "POST",
  "name" : "getSearchResults.json",
  "headers" : "{sec-ch-ua=\"Chromium\";v=\"106\", \"Google Chrome\";v=\"106\",
\"Not;A=Brand\";v=\"99\", X-XSRF-
TOKEN=wlGWawD_QV78Y6RQ_joSHyhVuMZtheJGIN7n071f5kw, sec-ch-ua-mobile=?0,
User-Agent=Mozilla/5.0 (Windows NT 10.0; Win64; x64) AppleWebKit/537.36 (KHTML, like
Gecko) Chrome/106.0.0.0 Safari/537.36, Content-Type=application/json,
Accept=application/json, text/javascript, */*; q=0.01, ... /serviceDashboardMobile.do?alcMode
=false&desktopMode=true&gnumber=XQT06677, X-Requested-With=XMLHttpRequest, sec-
ch-ua-platform=\"Windows\"}",
  "request" : [ {
    "maxSearchCount" : 10000,
    "statusFilter" : null,
    "searchType" : "IFA",
    "requestTimestamp" : 1666705841363,
    "savedSearchCriteria" : {
      "savedSearchName" : ""
    },
    "dashboardSearchCriteria" : {
    },
    "launchContext" : "",
    "loadSearchIndicator" : 4,
    "callBySavedSearch" : "Y",
    "gnumber" : "XQT06677",
    "loadColumns" : "Y",
    "callBySearchCriteria" : "N"
  } ],
  "timestamp" : 1.666705841363E12
} ]
```

305C1 brackets the whole block; 310C1 brackets the "request" object.

"getSearchResults.json" : [{
       ┌ "url" : "http:// ... getSearchResults.json",
         "method" : "POST",
         "name" : "getSearchResults.json",
         "headers" : "{sec-ch-ua=\"Chromium\";v=\"106\", \"Google Chrome\";v=\"106\",
       \"Not;A=Brand\";v=\"99\", X-XSRF-TOKEN=wlGWawD_QV78Y6RQ_joSHyhVuMZtheJGIN7n071f5kw, sec-
       ch-ua-mobile=?0, User-Agent=Mozilla/5.0 (Windows NT 10.0; Win64; x64) AppleWebKit/537.36 (KHTML,
       like Gecko) Chrome/106.0.0.0 Safari/537.36, Content-Type=application/json, Accept=application/json,
       text/javascript, */*; q=0.01, .../serviceDashboardMobile.do?alcMode=false
       &desktopMode=true&gnumber=XQT06677, X-Requested-With=XMLHttpRequest, sec-ch-ua-
       └ platform=\"Windows\"}",
         "request" : [{
           "maxSearchCount" : 10000,
           "statusFilter" : null,
           "requestTimestamp" : 1666705852198,
           "searchType" : "IFA",
           "savedSearchCriteria" : {
           },
           "dashboardSearchCriteria" : {
             "lineOfBusiness" : "",
             "lastName" : "",
305C2 ┤                                                   ├ 310C2
           ...

"accountNumber" : "77252468",
           "firmIdList" : [],
           "createdDate" : "",

...

"gnumber" : " XQT06677 ",
           "loadColumns" : "N",
           "callBySearchCriteria" : "Y"
          }],
       └ "timestamp" : 1.666705852198E12
        }]
```

FIG. 3D

```
"request" : [ {
  "maxSearchCount" : 10000,
  "statusFilter" : null,
  "requestTimestamp" : 1666705852198,
  "searchType" : "IFA",
  "savedSearchCriteria" : {
  },
  "dashboardSearchCriteria" : {
    "lineOfBusiness" : "",          ~405C
    "lastName" : "", "accountNumber" : " PH_AccountNumber ",    ~405A
    "firmIdList" : [],
    "createdDate" : "", "gnumber" : " PH_gnumber ",    ~405B
    "loadColumns" : "N",
    "callBySearchCriteria" : "Y"
} ],
```

```
"request" : [ {
  "maxSearchCount" : 10000,
  "statusFilter" : null,
  "requestTimestamp" : 1666705852198,
  "searchType" : "IFA",
  "savedSearchCriteria" : {
  },
  "dashboardSearchCriteria" : {
    "lob" : "",                          ~505C
    "lastName" : "",
    "accountNo" : " PH_AccountNumber ",  ~505A
    "firmIdList" : [ ],
    "createdDate" : "",
    "gNum" : " PH_gnumber ",             ~505B
    "loadColumns" : "N",
    "callBySearchCriteria" : "Y"
} ],
```
— 500

FIG. 5

SYSTEMS, METHODS, AND MEDIA FOR UPDATING, MANAGING, AND MAINTAINING A REFERENCE TEMPLATE FOR WEB SERVICE API TESTING

BACKGROUND

Technical Field

The present disclosure relates generally to web service API testing over a computer network, and more specifically to techniques for updating, managing, and maintaining a reference template for web service API testing.

Background Information

With the advancement of computer technology, a target application can now be accessed and utilized over a computer network via a web browser. To that end, a web service Application Program Interface (API) may provide the access and act as the interface between the web browser and the device, e.g., web server, hosting the target application.

In the area of software quality assurance and testing, there are several current tools that are available to implement automated testing for a target application's web service APIs. These tools may test various aspects of an API such as, but not limited to, endpoints, parameters, and/or methods. The goal of such tools is to ensure that the APIs exposed by the target application operate as expected.

To perform such testing, test data (e.g., API request payload identifiers with corresponding values) may be provided to interact with the web service API such that the web service of target application performs one or more desired functions. Output test result data may be compared to expected result data to determine if the web service API operates as expected. For example, test data may be automatically injected to interact with the web service API of a target application. The test data may trigger a workflow in the target application that corresponds to a specific business process scenario. The output from the test may be compared with results that would be expected if the target application operated correctly for the specific business process. If the output and expected results match, it may be determined that the web service API is operating as expected. If the output and expected results differ, it may be determined that the web service API is not operating as expected.

A target application can change over time due to, for example, periodic updates/enhancements. Such changes can result in updates to the web service APIs of the target application. This necessitates the need to change the test automation software such that it conforms to the updated web service APIs. For example, updates to the web service APIs may include changes to the API request payload identifiers that are used to call the web service. Such changes must be accounted for by the test automation software so that all test data can interact with the web service API to ensure proper testing. If not accounted for, all the test data may not be able to interact with the web service API, which can result in errors and/or incomplete testing.

With conventional systems and techniques, updating the test automation software is typically performed manually. As a result, such updating is prone to errors, time-consuming, inefficient, and limited in terms of scalability. Further, errors encountered during testing may be caused by any of a variety of different sources. Such sources may include, but are not limited to, latency issues, unidentified user interface (UI) changes, incomplete UI changes, broken links, Web Service API updates, and/or test automation being uncoordinated with the target application. Current and conventional test automation tools do not differentiate between such errors, which results in false failures and difficulty in resolving the errors. Therefore, currently available test automation tools have their limitations.

Further, and as an example, consider brokerage product domains that can have several systems and sub-systems that must be validated end-to-end. Specifically, and in certain workflow scenarios, interaction with a particular system of a brokerage product domain may be dependent on the interaction with a different system that is earlier in the workflow. Further, interaction with the particular system of the brokerage product domain may affect the interaction with another different system that is later in the workflow. With such dependencies between systems in a workflow, it is necessary to have test automation consistently and correctly initialized, managed, and updated to ensure proper test coverage for all systems in the workflow. Without such consistency and correctness, errors at a particular system in a workflow can have a cascading effect on other systems in the workflow, which in turn negatively impacts overall system performance and operation.

Conventional test automation systems do not automatically identify and account for the changes to web service APIs. Therefore, conventional test automation systems do not ensure proper test coverage for a changing web service API. Accordingly, conventional test automation systems can be error-prone and inefficient in terms of computing resources (e.g., processing resources). As such, using conventional test automation systems can result in poor-quality web service API testing.

SUMMARY

Techniques are provided for updating, managing, and maintaining a reference template for web service API testing according to the one or more embodiments as described herein. As will be described in further detail below, the one or more embodiments may update a reference template for web service API testing to avoid testing errors and perform proper test coverage.

In an embodiment, a processor (e.g., a processor executing a web service testing module) may obtain a plurality of logs associated with a target service that provide one or more web services. The logs may have information that includes, but are not limited to, network information, performance information, digital operating model (DOM) information, and browser-specific information. In an embodiment, the processor may filter the captured logs based on one or more URL extensions included in the captured logs. Alternatively, the captured logs may be filtered based on any information contained in the captured logs.

For each filtered log, the process may generate a baseline template. In an embodiment, the baseline template for a particular filtered log may be generated by (1) replacing information for each parameterized field with a placeholder value, and (2) extracting the API request payload data from the particular filtered log. The processor may determine if a reference template differs from a corresponding generated baseline template. In an embodiment, the reference template may be a test template that was used to previously test a web service API. If the reference template differs from the corresponding generated baseline template, the processor may generate a test template by replacing each different field identifier of the reference template with a corresponding baseline template identifier. If the reference template is similar to the corresponding generated baseline template, the processor may use the reference template as the test template. The test template may then be used in a test scenario to test one or more web service APIs of a target application.

Thus, the test template can account for web service APIs that may change, for example, based on updates/enhancements that are made to a target application over time.

In an embodiment, the processor may implement a procedure that performs both user interface (UI) and web service API testing. The processor may update a reference template when a failure is determined to be caused by an API request payload (e.g., out-of-date API request payload).

BRIEF DESCRIPTION OF THE DRAWINGS

The description below refers to the accompanying drawings, of which:

FIGS. 3A-3D are example captured logs that correspond to an example target application's web service APIs according to the one or more embodiments as described herein;

FIG. 4 is an example baseline template generated according to the one or more embodiments as described herein;

FIG. 5 is an example reference template according to the one or more embodiments as described herein;

DETAILED DESCRIPTION OF AN ILLUSTRATIVE EMBODIMENT

Figure 1:
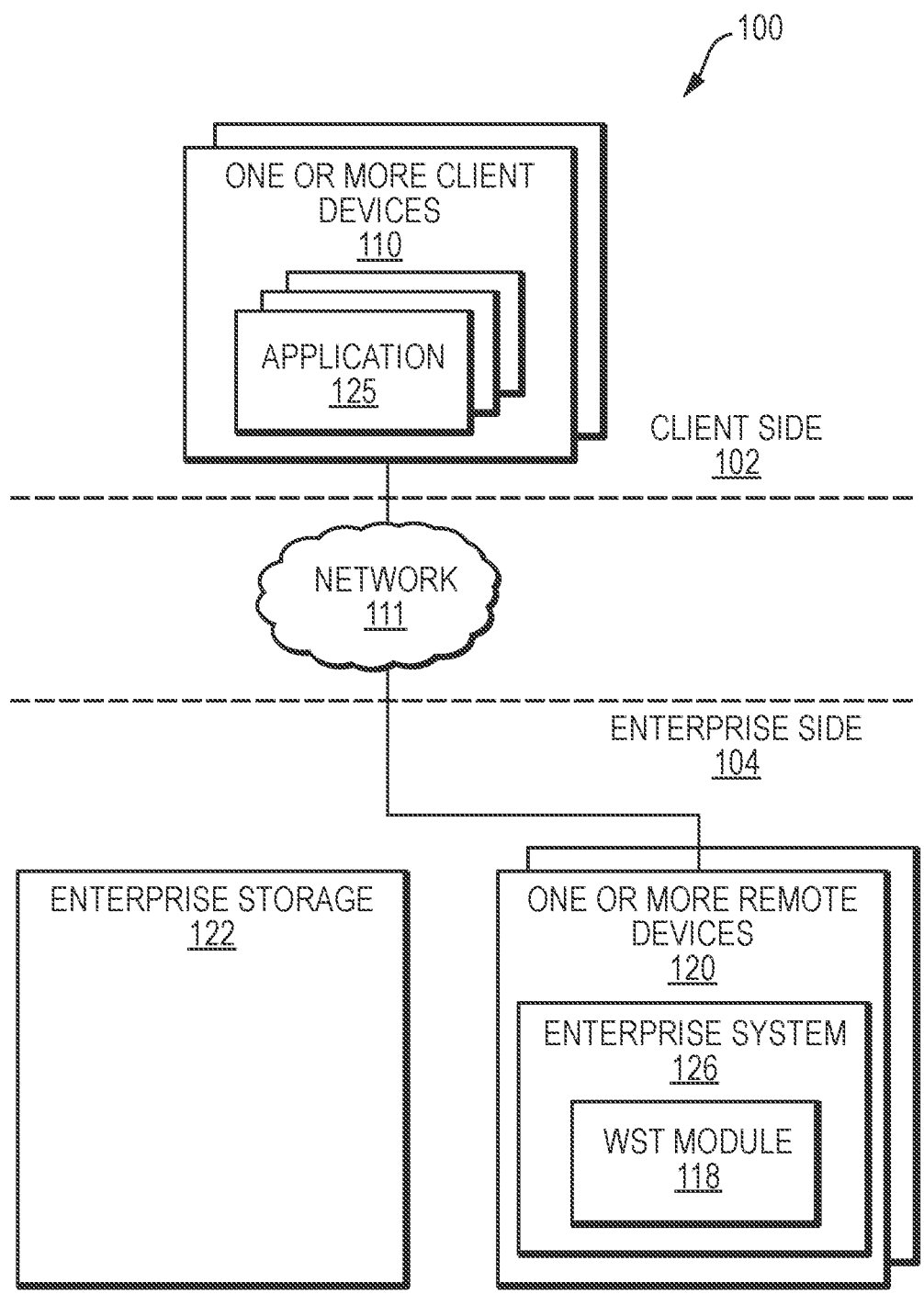
FIG. 1 is a high-level block diagram of an example system environment 100 for updating, managing, and maintaining a reference template for webs service API testing according to one or more embodiments as described herein.

FIG. 1 is a high-level block diagram of an example system environment 100 for updating, managing, and maintaining a reference template for webs service API testing according to one or more embodiments as described herein. The system environment 100 may be divided into a client side 102 that includes one or more local client devices 110 that are local to end users, and an enterprise side 104 that includes one or more remote devices 120 and enterprise storage 122 that are remote from the end users. Enterprise side 104 may be managed, operated, and maintained by an enterprise. In an embodiment, the enterprise of enterprise side may be a financial services institution.

The client side 102 may include one or more local client devices 110 that provide a variety of user interfaces and non-processing intensive functions. For example, a local client device 110 may provide a user interface, e.g., a graphical user interface and/or a command line interface, for receiving user input and displaying output according to the one or more embodiments as described herein. In an embodiment, the client device 110 may be a server, a workstation, a platform, a mobile device, a network host, or any other type of computing device. The client device 110 may be operated by, for example, customers of the enterprise. Client device 110 may also be operated by authorized personnel, e.g., employees of the enterprise, to perform enterprise functions. For example, client device 110 may download and execute application 125 that is provided by the enterprise. The execution of application 125 may allow customers and/or employees of the enterprise to implement one or more financial services functions.

The client device 110 may communicate with the enterprise system 126, managed/operated by the enterprise, over network 111. For example, a user may utilize application 125, executing on client device 110, to perform one or more functions at enterprise system 126 as will be described in further detail below.

Enterprise side 104 includes enterprise storage 122 that may store one or more templates, files, data structures, etc. that may be generated or utilized according to the one or more embodiments as described herein. For example, enterprise storage 122 may store a reference template that is updated and used for web service API testing according to the one or more embodiments as described herein. In an embodiment enterprise storage 122 may be one or more of (1) one or more databases (e.g., relational databases), hard disk drives (HDDs), and/or sold state drives (SSDs).

The enterprise side 104 also includes one or more remote devices 120 that may be one or more cloud-based devices and/or one or more server devices. The one or more remote devices 120 may store and execute enterprise system 126 that may implement the one or more embodiments as described herein. The enterprise system 126 may be accessible to its customers and/or authorized personnel, e.g., employees of the enterprise. The enterprise system 126 includes web service testing (WST) module 118 that may implement the one or more embodiments as described herein.

In an embodiment, only authorized personnel of the enterprise can execute the WST module 118 to implement the one or more embodiments as described herein. For example, authorized personnel of the enterprise may utilize client device 110 to execute WST module 118 to implement one or more embodiments as described herein. As will be described in further detail below, the WST module 118 may obtain a plurality of logs, each including API request payload data, to generate a baseline template. The WST module 118 may compare the baseline template with an existing reference template that was, for example, used for a previous test of a web service API. Based on the comparison, the WST module 118 may update the reference template to generate a test template that can be used with the web service API that has changed since the previous test, thereby preventing errors and ensuring proper test coverage.

Figure 2:
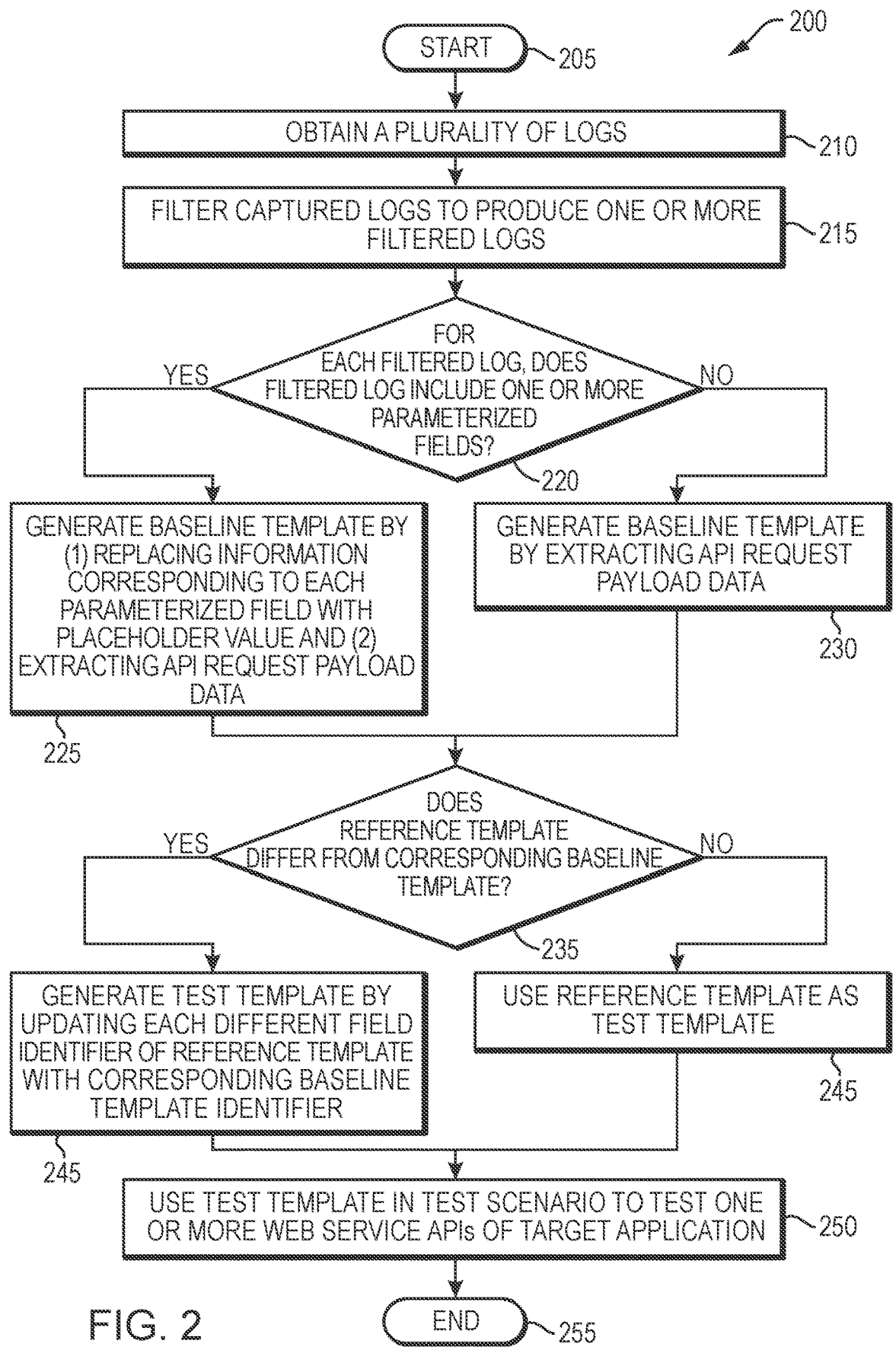
FIG. 2 is a flow diagram of a sequence of steps for automatically generating a test template for web service API testing by updating a reference template according to the one or more embodiments as described herein.

FIG. 2 is a flow diagram of a sequence of steps for automatically generating a test template for web service API testing by updating a reference template according to the one or more embodiments as described herein.

The procedure 200 starts at step 205 and continues to step 210 where the WST module 118 obtains a plurality of logs. The logs may be related to network, performance, digital operating model, and other browser specific information that are related to a web browser used to access/call a web service API of a target application. In an embodiment, the WST module 118 may utilize domains to capture, i.e., obtain, the logs. For example, a network domain may include events and commands for accessing the Hypertext Transfer Protocol (HTTP) requests and responses made when accessing a target application's web service API. As another example, a document object model domain may include events and commands for exposing APIs for reading from and writing to a document object model when accessing a target application web service API.

FIGS. 3A-3D are example captured logs that correspond to an example target application's web service APIs according to the one or more embodiments as described herein. A captured log may include API request payload data. In an embodiment, API request payload data may be the data that is used to interact with a web service API of a target application. If a request includes the correct API request payload data, the web service can be called to implement a target application function. If a request includes incorrect API request payload data, an error may be encountered such that the web service cannot be called to implement a target application function or the web service may be called incorrectly.

Each captured log may include a plurality of different fields and corresponding information. Each field may be identified by a field identifier that is surrounded by parentheses and positioned on the left-hand side of a particular colon in the captured log. There may be corresponding information (e.g., one or more alphanumeric characters, special characters, symbols, etc.) for the field on the right-hand side of the particular colon, where the corresponding information is also surrounded by parentheses.

Captured log 300A of FIG. 3A may be obtained (i.e., captured) based on a web service API call of a target application that checks a financial advisor channel role.

Captured log 300A may include log information 305A and API request payload data 310A. Log information 305A may define characteristics of the captured log 305A and/or the web service associated with the captured log 305A. For example, log information 305A may include a Uniform Resource Locator (URL) field that indicates the URL that is used to call the web service that corresponds to captured log 300A. That is, the captured log 300A is obtained based on calling a web service using the web service API that is accessible via a particular URL included in log information 305A. Log information 305A may also include a timestamp field that indicates a time when the web service was called and captured log 300A was obtained. The other fields of log information 305A may include other information defining and/or describing captured log 300A and/or the web service corresponding to captured log 300A.

Captured log 300A may also include API request payload data 310A. API request payload data 310A may include the payload fields used to interact with the target application's web service API that is accessible via the URL included in log information 305A. In an embodiment, the API request payload data 310A may correspond to the fields and corresponding information that are between the brackets (e.g., "[" and "]") and follows the colon for the "request" field in captured log 300A. In the example of FIG. 3A, there is no data between the brackets that follows the "request" field. As such, there is no data included in API request payload data 310A. That is, the API request payload data 310A of captured log 300A may be considered null.

FIG. 3B includes captured logs 300B1 and 300B2. Each of captured logs 300B1 and 300B2 have log information (e.g., log information 305B1 and log information 305B2) and API request payload data (e.g., API request payload data 310B1 and API request payload data 310B2). Each API request payload data 310B1 and 310B2 includes the data used to call a web service that gets preferences. Specifically, Each API request payload data 310B1 and 310B2 interacts with the target application's web service API, which is accessible via the URL that is included in the log information, to call the web service that gets preferences.

API request payload data 310B1 includes payload fields of "preferences", "preference", and category" that are used to interact with the web service API that calls the web service for getting particular preferences. API request payload data 310B2 includes payload fields of "preferences", "item", "preference", and category" that are used to interact with the web service API that calls the web service for getting particular preferences. API request payload data 310B1 and 310B2 may be different because each of the API request payload data 310B1 and 310B2 may be associated with getting different preferences (e.g., different types of preferences).

FIGS. 3C and 3D includes captured log 300C1 and 300C2, respectively. Each of captured logs 300C1 and 300C2 has log information (e.g., log information 305C1 and log information 305C2) and API request payload data (e.g., API request payload data 310C1 and API request payload data 310C2). For simplicity and ease of understanding, certain API payload fields of API request payload data 310C2 have been omitted, as indicated by the three ellipses.

Each API request payload data 310C1 and 310C2 includes the data used to call a web service that gets search results. Specifically, Each of API request payload data 310C1 and 310C2 interacts with the target application's web service API, which is accessible via the URL that is included in the log information, to call the web service that gets search results.

API request payload data 310C1 includes particular payload fields (e.g., "maxSearchCount", "statusFilter", . . . , "callBySearchCriteria") used to interact with the web service API that calls the web service for getting particular search results. API request payload data 310C2 includes particular payload fields (e.g., "maxSearchCount", "statusFilter", . . . , "accountNumber", . . . , "callBySearchCriteria") used to interact with the web service API that calls the web service for getting particular search results. API request payload data 310C1 and 310C2 may be different because each of the API request payload data 310C1 and 310C2 may be associated with getting different search results (e.g., performing a different type of search).

Although FIGS. 3A-3D include captured logs for particular types of web service API requests (e.g., get search results, get preferences, etc.) it is expressly contemplated that the captured logs according to one or more embodiments as described herein may include a variety of different or additional captured logs for different types of web service API requests. Further, although the captured logs of FIG. 3A-3D include particular field types with corresponding information, it is expressly contemplated that the logs captured according to the one or more embodiments as described herein may include a variety of different or additional field types and corresponding information.

Referring back to FIG. 2, the procedure continues from step 210 to step 215 and the WST module 118 filters the captured logs to produce one or more filtered logs. In an embodiment, the WST module 118 filters the captured logs based on a URL extension. In this example, let it be assumed that the WST module 118 filters the captured logs of FIGS. 3A-3D using the URL extension of "getSearchResults.json". Therefore, the WST module 118 may analyze each of the captured logs to determine which of the captured logs include a URL with an extension of "getSearchResults.json". In this example, captured logs 300C1 and 300C2 include the URL extension of "getSearchResults.json", while captured logs 300A, 300B1 and 300B2 do not include the URL extension of "getSearchResults.json". As such, the WST module may select, i.e., maintain, captured logs 300C1 and 300C2. Additionally, the WST module 118 may discard captured logs 300A, 300B1, and 300B2. Although the example as described herein filters captured logs using a URL extension, it is expressly contemplated that the captured logs may be filtered using any values within a captured log. For example, the captured logs may be filtered based on any string values included in the URL or based on any other value or identifier included in a captured log.

After filtering, the WST module 118 may group the filtered logs, e.g., those with URL extensions of "getSearchResults.json", by a web service request name. In an embodiment, a subset of filtered logs may be grouped together and saved for a particular web service using a web service name of the particular web service.

The WST module 118 may save the filtered logs as a hash map (e.g., nested hash map) and/or list. The WST module 118 may convert the hash map to any of a variety of different object formats (e.g., XML, Json, etc.) and store the object in enterprise storage 122. In an embodiment, the object may be stored with a name identifier. In an embodiment, the name identifier may be a current or future test scenario, e.g., API web service test scenario, under execution. For example, the test scenario may be for testing a web service API for a single account holder, while a different test scenario may be for testing the web service API for joint account holders.

The procedure continues to step 220 and the WST module 118 determines, for each filtered log, if the filtered logs includes one or more parameterized payload fields with corresponding information. Parameterized payload fields may include, but are not limited to, unique identifiers (e.g., personal identifiable information (PII)), cookies, account numbers, etc. For example, in captured log 300C1 of FIG. 3C, "gnumber" may be a parameterized payload field with corresponding information. Similarly, in captured log 300C2 of FIG. 3D, "account number" and "gnumber" may be parameterized payload fields with corresponding information.

If, at step 220, the WST module 118 determines that a filtered log includes at least one parameterized field with corresponding information, the procedure 200 continues to step 225. At step 225, the WST module 118 generates a baseline template for each filtered log by (1) identifying and replacing the information corresponding to each parameterized payload field with a placeholder value (e.g., predetermined value), and (2) extracting the API request payload data from the captured log.

For example, in captured log 300C2 of FIG. 3D, "accountNumber", and "gnumber" may be parameterized payload fields with corresponding information.

Thus, the WST module 118 may replace (i.e., mask/sanitize) the information (e.g., 77252468, and XQT06677), corresponding to the parameterized payload fields, with placeholder values as part of the baseline template generation process. Additionally, the WST module 118 may extract, e.g., segregate, the API request payload data of the filtered log. For the example of captured log 300C2, the WST module 118 may discard log information 305C2 and maintain API request payload data 310C2 to perform the extraction as part of the baseline template generation process.

FIG. 4 is an example baseline template generated according to the one or more embodiments as described herein. The baseline template 400 of FIG. 4 may correspond to the captured log 300C2 of FIG. 3D. Referring back to FIG. 3C, the parameterized payload fields of "accountNumber" and "gnumber" have corresponding information of 77252468 and XQT06677, respectively. As, the WST module 118 may replace these values with placeholder values of "PH_AccountNumber" and "PH_gnumber", respectively. Therefore, baseline template 400 includes parameterized fields with corresponding placeholder values at lines 405A and 405B of baseline template. Because parameterized field "lob" at line 405C of baseline template 400, the WST module 118 does not replace the corresponding information with a placeholder value.

Additionally, the WST module 118 may generate the baseline template by extracting, i.e., segregating, API request payload data 310C2. As such, the WST module 118 generates the baseline template 400, as depicted in FIG. 4, to include API request payload data 310C2 with parameterized payload fields and corresponding information 405A and 405B, and without log information 305C2 of FIG. 3D.

If, at step 220, the WST module 118 determines that a filtered log does not include at least one parameterized field with corresponding information, the procedure continues to step 230. At step 230, the WST module 118 determines that placeholder values are not required and the baseline template for the filtered log is generated as the API request payload data for the filtered log. For example, if captured log 300C1 of FIG. 3C did not include any parameterized fields with corresponding information, the WST module 118 would determine that the baseline template for captured log 300C1 includes API request payload data 310C1 of captured log 300C1.

Therefore, each of the filtered logs is utilized to generate/determine a corresponding baseline template. Because the baseline templates are generated from the captured logs, the baseline templates generated according to the one or more embodiments as described herein represent the required syntax and format needed to interact with the current version (e.g., updated or enhanced version) of the web service API. As such, and as will be described in further detail below, the baseline template can be compared to a most recent reference template used to perform web service API testing to determine if the reference template is out-of-date (e.g., the reference template does not account for the current syntax and/or format of the web service API). If the reference template is out-of-date, the reference template can be updated to generate a new test template that accounts for the updated syntax and/or format of the web service API according to the one or more embodiments as described herein.

Each baseline template may be stored on enterprise storage 122. In an embodiment, each baseline template may be stored with a corresponding web service request name. The web service request name can be used to identify one or more templates when a web service API, corresponding to the web service request name, is to be tested.

The procedure continues from steps 225 and 230 to step 235 and the WST module 118 determines if a reference template differs from a corresponding baseline template. In an embodiment, a reference template may include API request payload data that has been previously used in testing a web service API of a target application.

For example, a target application may periodically receive updates/enhancements. The updates/enhancements to the target application may cause modifications to the web service API. That is, the payload field identifiers of the web service API may change based on the updates/enhancements to the target application. Accordingly, if a reference template that was previously used in testing does not include the modified payload field identifiers and is then used again, the testing may encounter errors and/or the testing may be incomplete.

FIG. 5 is an example reference template according to the one or more embodiments as described herein. As depicted in FIG. 5, reference template 500 includes reference API request payload data. Reference API request payload data of reference template 500 may include a plurality of payload fields (e.g., "maxSearchCount", "StatusFilter", etc.) that were used for the testing of a web service API of a target application. That is, the plurality of payload fields may have been correct for interacting with the web service API to implement a function of a previous version of the target application. However, and based on an update/enhancement to the target application, the plurality of payload fields might be incorrect for interacting with the current web service API to implement a function of the updated/enhanced version of the target application. As such, the WST module 118 may compare the reference template and the baseline template to determine if the API payload identifiers have changed between updates of the target application.

To determine if the reference template differs from the corresponding baseline template, the WST module 118 may compare each field identifier of the reference template 500 with a corresponding field identifier of the baseline template 400. If at least one field identifier of the reference template is syntactically different from the corresponding field identifier of the baseline template 400, the WST module 118 may determine that the reference template 500 differs from the baseline template 400. Further, if the reference template 500 includes a field identifier that is missing from the baseline template 400, the WST module 118 may determine that the reference template 500 is different from the baseline template 400. Moreover, if the baseline template 400 includes a field identifier that is missing from the reference template 500, the WST module 118 may determine that the reference template 500 is different from the baseline template 400.

In this example, the WST module 118 may syntactically compare each field of the reference template 500 with the baseline template 400 to determine if a difference exists. In an embodiment, the WST module 118 may perform the syntactical comparison from top to bottom. For example, the WST module 118 may identify "maxSearchCount" as the first field identifier of the reference template 500. The WST may also identify "maxSearchCount" as the first field identifier of the baseline template 400. The WST module 118 may perform a characterwise comparison of the two field identifiers to determine if they are the same or different.

In this example, the two field identifiers of "maxSearchCount" from the reference template 500 and the baseline template 400 are the same. The WST module 118 may perform a similar comparison for each of the other field identifiers from the reference template 500 and the baseline template 400. For example, and continuing with the above example, the WST module 118 may identify the field identifier of "lob" and corresponding information at line 505C of reference template 500. Additionally, the WST module 118 may identify the corresponding field identifier of "lineOfBusiness" and at line 405C of baseline template 505C. The WST module 118 may perform a characterwise comparison of the two field identifiers and determine that the two field identifiers, both of which represent line of business, are different. Similarly, the WST module 118 may determine that "accountNo" at line 505A of the reference template 500 is different than "accountNumber" at line 405A of the baseline template 400. Additionally, the WST module 118 may determine that "gNum" at line 505B of the reference template 500 is different than "gnumber" at line 405B of the baseline template 400.

Therefore, and based on the comparison, the WST module 118 determines that three field identifiers of the reference template 500 are different than three corresponding field identifiers of the baseline template 400. Because at least one field identifier of the reference template 500 is different from baseline template 400, the procedure continues from 235 to step 240. At step 240, the WST module 118 generates a test template by updating each field identifier of the reference template that is determined to be different than its corresponding field identifier from the baseline template. In an embodiment, the field identifier of the reference template, which is determined to be different from the corresponding field identifier of the baseline template, is updated with the field identifier of the baseline template.

Therefore, and in this example, the WST module 118 replaces "lob" of the reference template 500 with "lineOfBusiness" from the baseline template 400. Similarly, the WST module 118 replaces "accountNo" and "gNum" of the reference template 500 with "accountNumber" and "gnumber" of the baseline template, respectively. Based on the updating, the WST module 118 generates a new or updated reference template that may replace the reference template for a future or subsequent test of the web service API.

By using the updated reference template as the test template to perform the web service API testing, the one or more embodiments as described herein avoid errors when compared to conventional systems and techniques that may utilize the reference template (e.g., an old template) that includes out-of-date (i.e., stale) API payload field identifiers. Specifically, conventional systems may try to use an existing reference template when performing web service API testing for an updated web service API that has that is caused from a target application update/enhancement. The API payload field identifiers, e.g., "lob", "accountNo", and "gNum", of the reference template may be valid for the old version of the web service API prior to the update/enhancement. However, these payload field identifiers would be inconsistent with the updated web service API. As a result, errors would be encountered and/or incomplete testing would be performed when conventional systems and techniques use the reference template with the updated web service API.

The one or more embodiments overcome this deficiency by automatically updating the reference template to generate a test template that is consistent with a changing web service API. As a result, the one or more embodiments as described herein provide an improvement in the existing technological field of web service API testing over a computer network (e.g., Internet).

Because less errors are encountered when compared to conventional systems, the one or more embodiments as described herein also conserve processing and memory resources of the computing device, e.g., client device 110 and/or enterprise system 120, itself. Specifically, and when errors are encountered using conventional systems, processing and memory resources are consumed and utilized to handle the errors. That is, the processing and memory resources cannot be reallocated and used for different tasks because the processing and memory resources are being consumed by the current test that cannot be completed. In contrast, the test template that is configured to account for the changed web service API allows the current test to reach completion, which in turn allows the processing and memory resources to be reallocated and used for different tasks. As such, the one or more embodiments as described herein conserve processing and memory resources.

Referring back to FIG. 2, if it is determined that the reference template does not differ from a corresponding baseline template at step 235, the procedure continues to step 245. At step 245, the WST module 118 uses (i.e., generates) the reference template as the test template. Specifically, the reference template not differing from the corresponding baseline template provides an indication that the web service API (e.g., payload field identifiers) did not change based on the update/enhancement to the target application.

Therefore, the one or more embodiments as described herein can determine, on the fly and in near real-time, whether a template used for web service Api testing needs to be updated or not such that proper testing (e.g., proper test coverage) of the web service API can be performed and errors can be avoided. As such, the one or more embodiments as described herein provide an improvement in the existing technological field of web service API testing over a computer network.

The procedure 200 continues from steps 240 and 245 to step 250. At step 250, the WST module 118 uses the test template in a test scenario to test one or more web service APIs of a target application. For example, the test scenario may be for testing a web service API for a single account holder, while a different test scenario may be for testing the web service API for joint account holders. More robust testing (e.g., larger number of test templates that make up a test scenario) included in a test scenario ensures better test coverage for the testing of a web service API. It is expressly contemplated that the test template, generated according to the one or more embodiments as described herein, may be utilized in any of a variety of different ways to test a web service API.

The procedure 200 ends at step 255.

Figure 6:
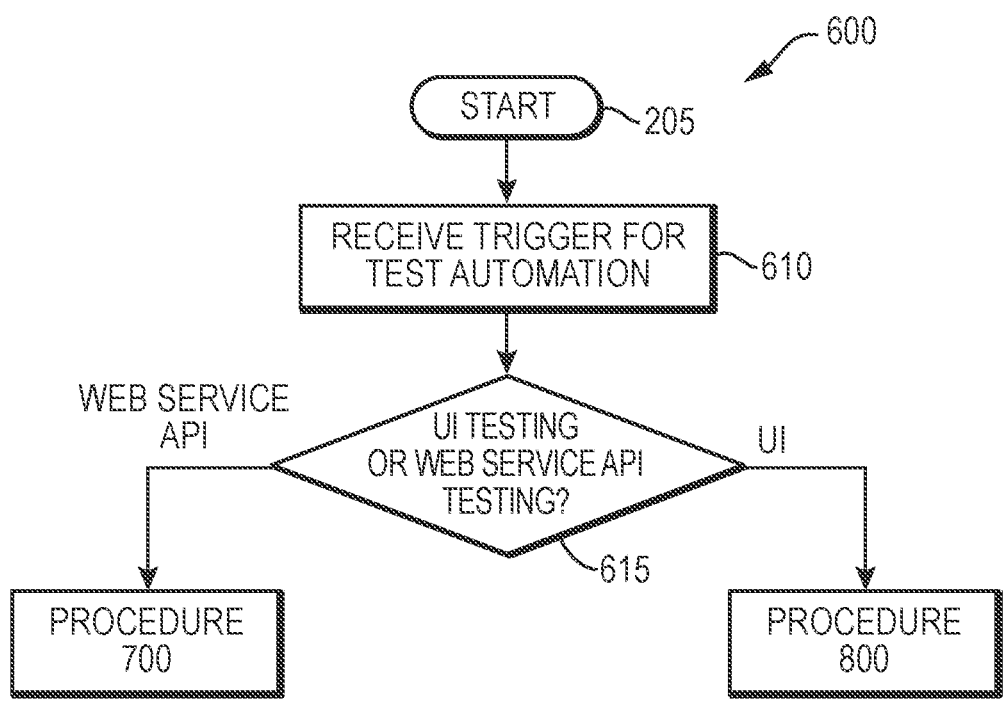
FIG. 6 is a flow diagram of a sequence of steps for implementing a testing procedure that includes UI testing and web service API testing according to the one or more embodiments as described herein.

The WST module 118 may also implement a testing procedure that includes UI testing and web service API testing. FIG. 6 is a flow diagram of a sequence of steps for implementing a testing procedure that includes UI testing and web service API testing according to the one or more embodiments as described herein.

The procedure 600 starts at step 605 and continues to step 610. At step 610 the WST module 118 receives a trigger to perform test automation. For example, authorized personnel of the enterprise may use application 125 executing on client device 110 to initiate the testing on-demand. Alternatively, the testing may be preconfigured and occur on a predetermined schedule (e.g., daily). The procedure continues to step 615 and the WST module 1180 determines if the trigger is for UI testing or Web service API testing.

Figure 7:
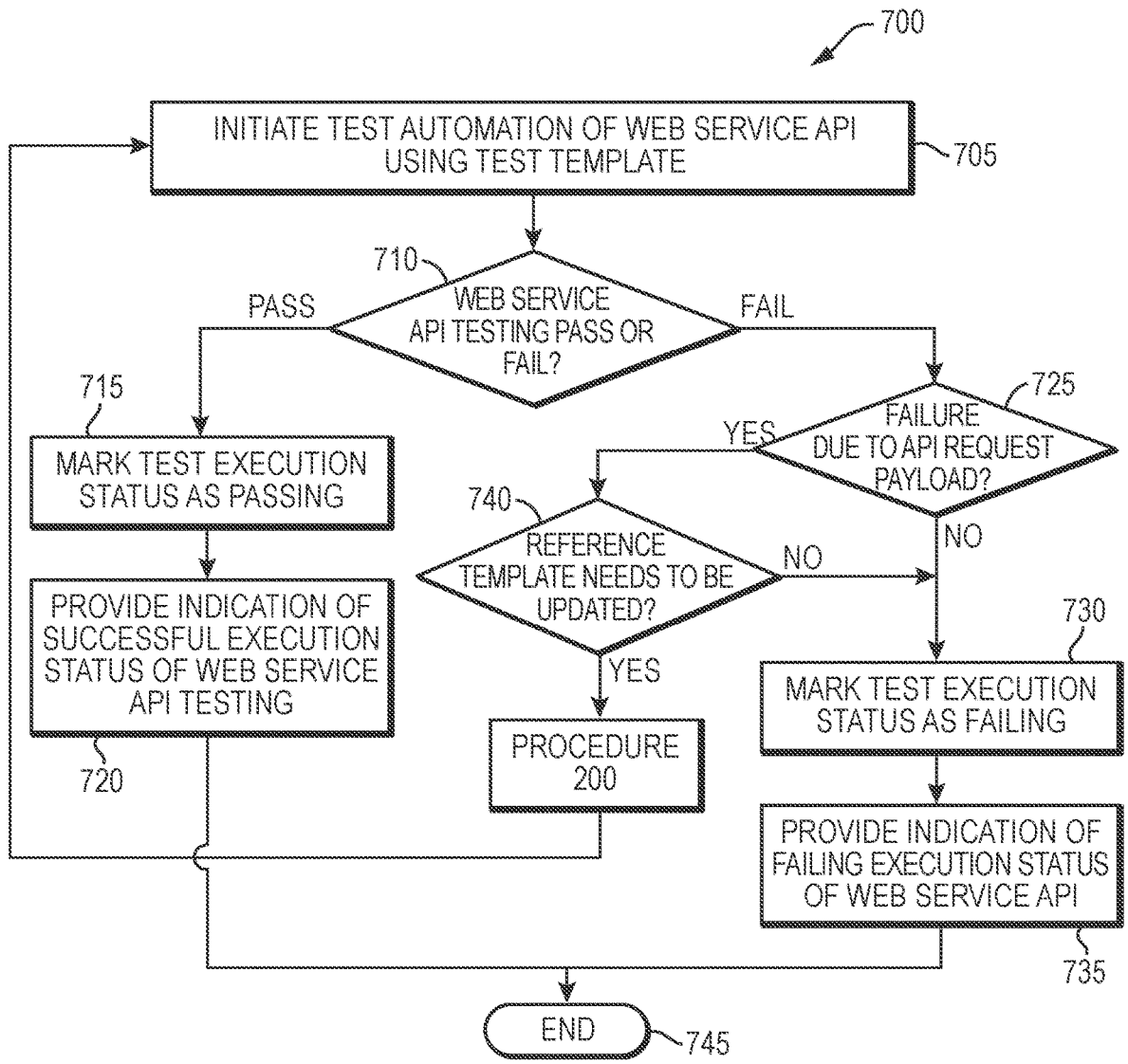
FIG. 7 is a flow diagram of a sequence of steps for a portion of the flow diagram of FIG. 6 that corresponds to web service API testing according to the one or more embodiments as described herein.
Figure 8:
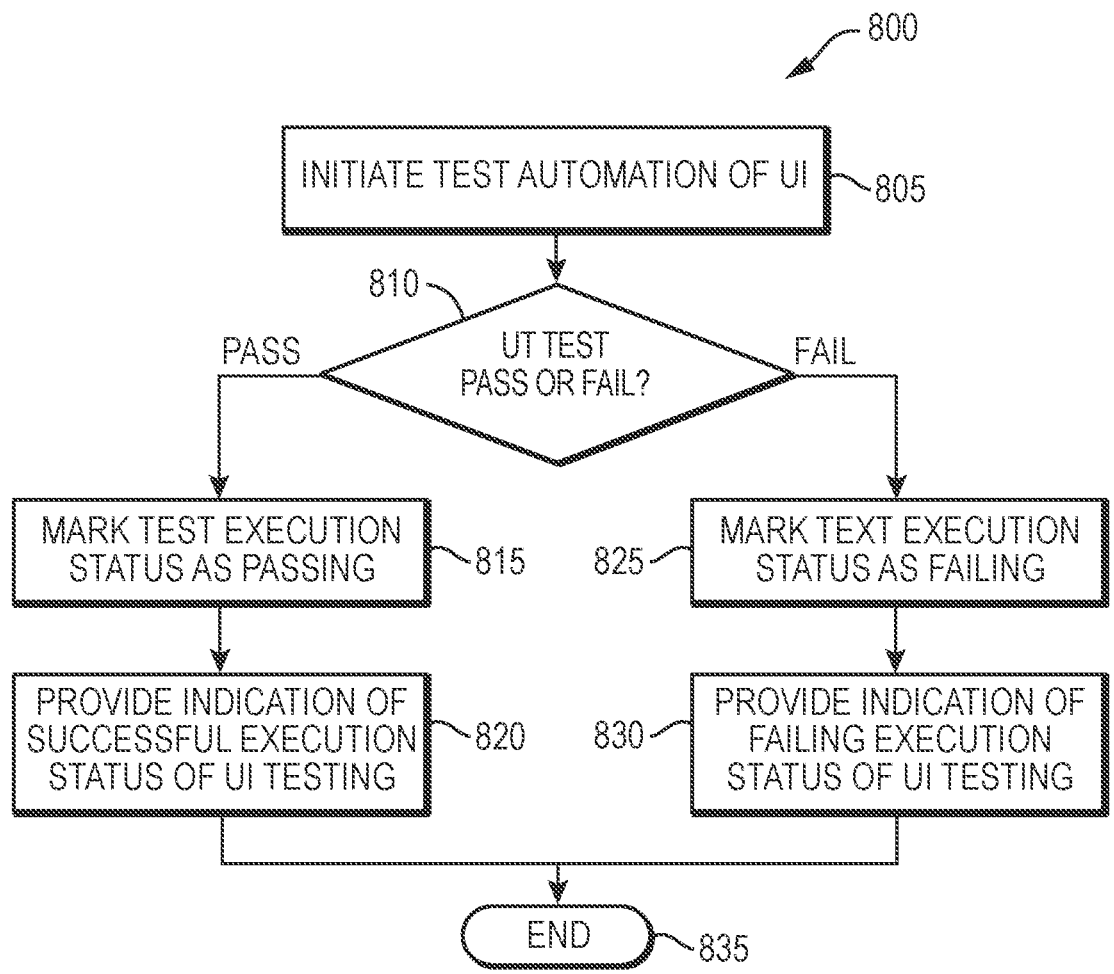
FIG. 8 is a flow diagram of a sequence of steps for a portion of the flow diagram of FIG. 6 that corresponds to UI testing according to the one or more embodiments as described herein.

If, at step 615, the WST module 118 determines that the trigger is for web service API testing, the procedure 600 continues to procedure 700 of FIG. 7. FIG. 7 is a flow diagram of a sequence of steps for a portion of the flow diagram of FIG. 6 that corresponds to web service API testing according to the one or more embodiments as described herein. If, at step 615, the WST module 118 determines that the trigger is for UI testing, the procedure 600 continues to procedure 800 of FIG. 8. FIG. 8 is a flow diagram of a sequence of steps for a portion of the flow diagram of FIG. 6 that corresponds to UI testing according to the one or more embodiments as described herein.

At step 705 of FIG. 7, WST module 118 initiates test automation of a web service API using a test template. The test template may be, for example, a reference template that was used on a previous iteration of a web service API testing. Alternatively, the test template may be an updated reference template based on the procedure 200 as will be described in further detail below.

The procedure continues to step 710 and the WST module 118 determines if the testing of the web service API, using the test template, fails or passes. In an embodiment, the WST module 118 may compare output test result data from the testing with expected results to determine if the testing passed or failed. For example, test data may be automatically injected to interact with the web service API of a target application. The test data may trigger a workflow in the target application that corresponds to a specific business process scenario. The WST module 118 may compare the output from the test with results that would be expected if the web service API operated correctly. If the output and expected results match, the WST module 118 may determine that the web service API and target application are operating as expected. If the output and expected results differ, the WST module 118 may determine that the web service API and/or target application are not operating as expected.

If, at step 710, the WST module 118 determines that the testing passes the procedure continues to step 715. At step 715 the WST module 118 marks the test execution status as passing. The procedure continues to step 720 and the WST module 118 provides an indication of the successful execution status of the web service API testing. For example, the WST module 118 may provide a message or notification that is displayed on a client device 110, operated by authorized personnel who initiated the testing, indicating the successful execution status of the web service API testing. The procedure then ends at step 745.

If, at step 710, the WST module 118 determines that the testing failed, the procedure continues to step 725. At step 725, the WST module 118 determines if the failure is due to the API request payload. In an embodiment, the WST module 118 determines that the failure was due to the API request payload by analyzing HTTP response status code values for an API call and/or messages in a response body. For example, a particular status code value (e.g., 400) may be indicative of a bad request. Additionally, a message in a response body (e.g., "accountNumberMID tag is incorrect" or "lineofBusiness tag is incorrect") may be indicative of an incorrect tag for an API request payload identifier. Such a code value and/or message in a response body may indicate that a failure is due to the API request payload.

If, at step 725, the WST module 118 determines that the failure was not due to the API request payload, the procedure continues to step 730 and the WST module marks the test execution status as a failure. The procedure continues to step 735 and the WST module 118 provides an indication of the failing execution status of the web service API testing. For example, the WST module 118 may provide a message or notification that is displayed on a client device 110, operated by authorized personnel who initiated the testing, indicating the failing execution status of the web service API testing. The procedure then ends at step 745.

If, at step 725, the WST module 118 determines that the failure was due to the API request payload, the procedure continues to step 740 and the WST module 118 determines if the reference template needs to be updated. In an embodiment, the WST module determines that the reference template needs to be updated by comparing the status code values for an API call and/or messages in the response body with the baseline template, which would trigger a successful API status code and response. Based on the comparison, it can be determined that a difference exists and the reference template needs to be updated. If the comparison results in no difference, then the reference template does not need to be updated.

If, at step 740, the WST module 118 determines that the reference template does not need to be updated the procedure continues to step 730. If, at step 740, the WST module 118 determines that the reference template needs to be updated, the procedure continues from step 740 to procedure 200 as described above in relation to FIG. 2. The procedure then reverts back to step 705 and the web service API is tested using the updated reference template generated from the procedure of FIG. 2. Therefore, the updated reference template is used as the test template at step 705 of FIG. 7. As such, the procedure of 700 repeats until it is determined that (1) the reference template does not need to be updated when the failure is due to the API request payload, (2) the failure of the testing is not due to the API request payload, or (3) the testing passes.

Referring back to FIG. 6, if the WST module 118 determines at step 615 that the trigger is for UI testing, the procedure 600 continues to procedure 800 of FIG. 8. At step 805 of FIG. 8, the WST module 118 initiates test automation of a UI. Test automation of the UI may be performed in any of a variety of different ways as known by those skilled in the art. In an embodiment, test automation of the UI may involve ensuring that fields, labels, buttons, and/or other items displayed operate as expected. For example, test automation of the UI may be performed for toolbars, colors, fonts, sizes, icons and determining if these items respond as expected based on user input.

The procedure continues to step 810 and the WST module 118 determines if the testing of the UI fails or passes. In an embodiment, the WST module 118 may compare output test result data from testing the UI with expected results to determine if the testing passed or failed. If the output and expected results match, the WST module 118 may determine that the UI is operating as expected. If the output and expected results differ, the WST module 118 may determine that the UI is not operating as expected.

If, at step 810, the WST module 118 determines that the testing passes the procedure continues to step 815. At step 815 the WST module 118 marks the test execution status as passing. The procedure continues to step 820 and the WST module 118 provides an indication of the successful execution status of the UI testing. For example, the WST module 118 may provide a message or notification that is displayed on a client device 110, operated by authorized personnel who initiated the testing, indicating the successful execution status of the UI testing. The procedure then ends at step 835.

If, at step 810, the WST module 118 determines that the testing failed, the procedure continues to step 825. At step 825, the WST module 118 marks the test execution status as failing. The procedure continues to step 830 and the WST module 118 provides an indication of the failing execution status of the UI testing. For example, the WST module 118 may provide a message or notification that is displayed on a client device 110, operated by authorized personnel who initiated the testing, indicating the failing execution status of the UI testing. The procedure then ends at step 835.

It should be understood that a wide variety of adaptations and modifications may be made to the techniques. For example, the steps of the flow diagrams as described herein may be performed sequentially, in parallel, or in one or more varied orders. Further, although the examples as described herein refer to web service API testing, it is expressly contemplated that the one or more embodiments as described herein are applicable to other areas of test automation. Such areas may include, but are not limited to, web application UI component validation test automation, web application UI workflow test automation, mobile app UI component validation test automation, mobile app UI workflow validation test automation, desktop application component UI validation test automation, desktop application workflow validation test automation, etc.

In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the term user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A computerized method for updating, managing, and maintaining a reference payload template for web service application program interface (API) testing, the computerized method comprising:

obtaining a plurality of logs each including at least payload data;

identifying at least one selected log that include selected information;

determining if the at least one selected log includes one or more parameterized field values within the payload data;

in response to determining that the at least one selected log includes the one or more parameterized field values, replacing each of the one or more parameterized field values with a predefined value to generate a baseline payload template;

in response to determining that the at least one selected log does not include the one or more parameterized field values, determining that the at least one selected log is the baseline payload template;

automatically comparing each baseline payload field of the baseline payload template to a corresponding reference payload field of the reference payload template;

in response to determining that a selected baseline payload field does not match a corresponding selected reference payload field, automatically replacing the corresponding selected reference payload field of the reference payload template with the selected baseline payload field to generate an updated reference payload template; and using the updated reference payload template for the web service API testing.

2. The computerized method of claim 1, wherein the at least one selected log includes one or more of (1) network information, (2) performance information, (3) digital operating model (DOM) information, and (4) browser-specific information.

3. The computerized method of claim 1, wherein the selected information is one or more of (1) a Uniform Resource Locators (URL), (2) a selected value within the URL, (3) or a URL extension.

4. The computerized method of claim 1, wherein the one or more parameterized field values are one or more of unique identifiers, cookies, account numbers, or personally identifiable information (PII).

5. The computerized method of claim 1, wherein at least one selected log includes a plurality of selected logs, the method further comprising:
grouping a first subset of the plurality of selected logs into a first group based on a first web service request name identified in each first log included in the first subset;
using a first updated reference payload template, updated with first baseline payload fields of a first baseline payload template, for testing a first web service corresponding to the first web service request name;
grouping a second subset of the plurality of selected logs into a second group based on a second web service request name identified in each second log included in the second subset; and
using a second update reference payload template, updated with second baseline payload fields of a second baseline payload template, for testing a second web service corresponding to the second web service request name.

6. The computerized method of claim 5, wherein the first group with the first web service request name and the second group with the second web service request name are stored as one or more nested hash maps and lists.

7. The computerized method of claim 1, further comprising:
generating a further updated reference payload template by performing one or more of (1) updating the updated reference payload template to include a new field, (2) modifying a selected field of the updated reference payload template, or (3) deleting an existing field of the updated reference payload template; and
using the further updated reference payload template for the web service API testing.

8. The computerized method of claim 1, further comprising:
executing an initial web service API test;
determining that the initial web service API test fails;
determining that the failure of the initial web service API test is a payload failure;
determining that the reference payload template requires updating;
in response to determining that the reference payload template requires updating, obtaining the plurality of logs.

9. A system for updating, managing, and maintaining a reference payload template for web service application program interface (API) testing, the system comprising:
a processor coupled to a memory, the processor configured to:
obtain a plurality of logs each including at least payload data;
identify at least one selected log that include selected information;
determine if the at least one selected log includes one or more parameterized field values within the payload data;
replace, in response to determining that the at least one selected log includes the one or more parameterized field values, each of the one or more parameterized field values with a predefined value to generate a baseline payload template;
determine, in response to determining that the at least one selected log does not include the one or more parameterized field values, that the at least one selected log is the baseline payload template;
compare each baseline payload field of the baseline payload template to a corresponding reference payload field of the reference payload template;
replace, in response to determining that a selected baseline payload field does not match a corresponding selected reference payload field, the corresponding selected reference payload field of the reference payload template with the selected baseline payload field to generate an updated reference payload template; and
use the updated reference payload template for the web service API testing.

10. The system of claim 9, wherein the at least one selected log includes one or more of (1) network information, (2) performance information, (3) digital operating model (DOM) information, and (4) browser-specific information.

11. The system of claim 9, wherein the selected information is one or more of (1) a Uniform Resource Locators (URL), (2) a selected value within the URL, (3) or a URL extension.

12. The system of claim 9, wherein the one or more parameterized field values are one or more of unique identifiers, cookies, account numbers, or personally identifiable information (PII).

13. The system of claim 9, wherein at least one selected log includes a plurality of selected logs, the processor further configured to:
group a first subset of the plurality of selected logs into a first group based on a first web service request name identified in each first log included in the first subset;
use a first updated reference payload template, updated with first baseline payload fields of a first baseline payload template, for testing a first web service corresponding to the first web service request name;
group a second subset of the plurality of selected logs into a second group based on a second web service request name identified in each second log included in the second subset; and
use a second update reference payload template, updated with second baseline payload fields of a second baseline payload template, for testing a second web service corresponding to the second web service request name.

14. The system of claim 13, wherein the first group with the first web service request name and the second group with the second web service request name are stored as one or more nested hash maps and lists.

15. The system of claim 9, wherein the processor is further configured to:
generate a further updated reference payload template by performing one or more of (1) updating the updated reference payload template to include a new field, (2) modifying a selected field of the updated reference payload template, or (3) deleting an existing field of the updated reference payload template; and
use the further updated reference payload template for the web service API testing.

16. The system of claim 9, wherein the processor is further configured to:
execute an initial web service API test;
determine that the initial web service API test fails;
determine that the failure of the initial web service API test is a payload failure;
determine that the reference payload template requires updating;

obtain, in response to determining that the reference payload template requires updating, the plurality of logs.

17. A non-transitory computer readable medium having software encoded thereon, the software when executed by one or more computing devices operable to:
obtain a plurality of logs each including at least payload data;
identify at least one selected log that include selected information;
determine if the at least one selected log includes one or more parameterized field values within the payload data;
replace, in response to determining that the at least one selected log includes the one or more parameterized field values, each of the one or more parameterized field values with a predefined value to generate a baseline payload template;
determine, in response to determining that the at least one selected log does not include the one or more parameterized field values, that the at least one selected log is the baseline payload template;
compare each baseline payload field of the baseline payload template to a corresponding reference payload field of the reference payload template;
replace, in response to determining that a selected baseline payload field does not match a corresponding selected reference payload field, the corresponding selected reference payload field of the reference payload template with the selected baseline payload field to generate an updated reference payload template; and
use the updated reference payload template for the web service API testing.

18. The non-transitory computer readable medium of claim 17, wherein the at least one selected network log includes one or more of (1) network information, (2) performance information, (3) digital operating model (DOM) information, and (4) browser-specific information.

19. The non-transitory computer readable medium of claim 17, wherein the selected information is one or more of (1) a Uniform Resource Locators (URL), (2) a selected value within the URL, (3) or a URL extension.

20. The non-transitory computer readable medium of claim 17, wherein the one or more parameterized field values are one or more of unique identifiers, cookies, account numbers, or personally identifiable information (PII).

* * * * *